United States Patent
Brock et al.

(10) Patent No.: US 8,511,559 B2
(45) Date of Patent: Aug. 20, 2013

(54) APPARATUS FOR AND METHOD OF READING TARGETS BY IMAGE CAPTURED BY PROCESSING CAPTURED TARGET IMAGES IN A BATCH OR FREE-RUNNING MODE OF OPERATION

(75) Inventors: Christopher Warren Brock, Manorville, NY (US); Robert Pang, Williston Park, NY (US); Thomas Lackemann, Sayville, NY (US); Miroslav Trajkovic, Centereach, NY (US)

(73) Assignee: Symbol Technologies, Inc., Holtsville, NY (US)

(*) Notice: Subject to any disclaimer, the term of this patent is extended or adjusted under 35 U.S.C. 154(b) by 16 days.

(21) Appl. No.: 13/278,670

(22) Filed: Oct. 21, 2011

(65) Prior Publication Data

US 2013/0098997 A1   Apr. 25, 2013

(51) Int. Cl.
*G06K 7/10*   (2006.01)
*G06K 7/14*   (2006.01)

(52) U.S. Cl.
USPC . 235/454; 235/494; 235/462.24; 235/462.41; 235/462.11

(58) Field of Classification Search
USPC ............... 235/454, 375, 487, 462.11, 462.41, 235/462.24
See application file for complete search history.

(56) References Cited

U.S. PATENT DOCUMENTS

| | | | |
|---|---|---|---|
| 2004/0024983 A1* | 2/2004 | Satoh et al. | 711/171 |
| 2009/0218403 A1* | 9/2009 | Joseph et al. | 235/462.21 |
| 2012/0085818 A1* | 4/2012 | Williams | 235/375 |

* cited by examiner

*Primary Examiner* — Edwyn Labaze (57) ABSTRACT

Targets associated with transactions to be processed at a workstation are read by capturing return light from the targets with an array of light sensors of a solid-state imager having a field of view that extends through a workstation window to the targets. A controller controls the imager to operate at a frame rate to acquire images of the targets over successive frames in either a batch mode or a free-running mode. A memory stores the acquired images. The controller processes all of the stored images, and processes at least one of the stored images over an extended time period greater than one of the frames.

18 Claims, 5 Drawing Sheets

APPARATUS FOR AND METHOD OF READING TARGETS BY IMAGE CAPTURED BY PROCESSING CAPTURED TARGET IMAGES IN A BATCH OR FREE-RUNNING MODE OF OPERATION

FIELD OF THE DISCLOSURE

The present disclosure relates generally to an apparatus for, and a method of, reading targets by image capture at a workstation and, more particularly, to processing captured images of the targets in a batch or free-running mode of operation.

BACKGROUND

Solid-state imaging workstations, that are configured either as vertical slot scanners each having a generally vertically arranged, upright window, or as flat-bed or horizontal slot scanners each having a generally horizontally arranged window, or as bi-optical, dual window scanners each having both generally horizontally and vertically arranged windows, or as stand-mounted, stationary scanners having a presentation window, have been installed in many venues, such as supermarkets, department stores, and other kinds of retailers, as well as warehouses, and other kinds of industrial settings, for many years, to electro-optically read by image capture a plurality of symbol targets, such as one-dimensional symbols, particularly Universal Product Code (UPC) bar code symbols, and two-dimensional symbols, as well as non-symbol targets, such as driver's licenses, receipts, signatures, etc., the targets being associated with objects or products to be processed by the workstations. An operator or a customer may slide or swipe a product associated with, or bearing, a target in a moving direction across and past a window of the workstation in a swipe mode. Alternatively, the operator or the customer may momentarily present the target associated with, or borne by, the product to an approximate central region of a window, and steadily momentarily hold the target in front of the window, in a presentation mode. The choice depends on user preference, or on the layout of the workstation, or on the type of the target.

Known imaging workstations typically include an imaging scan engine or module for supporting a solid-state, image sensor or imager comprising an array of pixels or photosensors, for sensing return light returning through a window of the workstation from a target being imaged. The image sensor may be a one- or two-dimensional charge coupled device (CCD) or a complementary metal oxide semiconductor (CMOS) device, operable at a frame rate, and is analogous to the image sensors used in electronic digital cameras. The known imaging workstations also typically include an illuminating light system for illuminating the target with illumination light from an illumination light source, e.g., one or more light emitting diodes (LEDs), through the window of the workstation; an imaging lens assembly, e.g., one or more imaging lenses, for capturing return ambient and/or illumination light scattered and/or reflected from the target through the window of the workstation over a reading field of view and over a range of working distances relative to the window; and electrical circuitry for producing electronic analog signals corresponding to the intensity of the light captured by the image sensor over the reading field of view, and for digitizing the analog signal. The electrical circuitry typically includes a controller or programmed microprocessor for controlling operation of the electrical components supported by the workstations, and for processing the target and/or decoding the digitized signal based upon a specific symbology when the target is a symbol.

Some known workstations continuously capture and attempt to process and/or decode targets without regard to whether or not a target is actually in the reading field of view of the scan engine. However, continuous, repetitive, flashing of bright light from the LEDs of the illuminating light system consume and waste energy, degrade component lifetimes, and can be perceived as bothersome, distracting and annoying to the operators of the readers and to nearby consumers being served. To alleviate these problems, the known imaging workstations also typically include an object sensing system for activating the scan engine, e.g., the illuminating light system, only if an object or product bearing, or associated with, a target is detected within the active reading field of view of the scan engine. The object sensing system has one or more object light sources for emitting object sensing light, typically infrared (IR) light, and at least one object sensor for sensing the return IR light reflected and/or scattered from the object over an object detection field of view.

The known imaging scan engine is typically configured to operate in real time to process and decode a symbol target as quickly as it can within each and every single frame of the image sensor. For example, if the image sensor operates at a nominal frame rate of about 60 frames per second, then the fastest frame lasts about 16.67 milliseconds. In this case, the imaging scan engine works in real time to process, decode and successfully read a symbol target in a minor fraction of a single one of the fastest frame, e.g., less than 1 millisecond, and preferably less than 0.5 milliseconds. This is generally satisfactory for aggressive, fast reading performance. However, there are certain situations where such fast performance cannot be readily realized.

For example, sometimes more time is needed to successfully read the symbol target. Thus, the symbol target may be poorly printed, or poorly or not illuminated, or poorly presented to the window, or be located too far from the window, or be encoded with a great deal of information (e.g., two-dimensional symbols), or be of a symbol density and size that requires extensive processing time, etc. In these and other circumstances, the known imaging scan engine may need more than one frame to process, decode and successfully read the symbol target and, indeed, may need several frames. When a particular symbol target takes longer than a single frame to analyze, its captured image might be discarded early, thereby missing the opportunity to successfully read the captured image if only there were sufficient time. Or, the scan engine might spend more time than one frame trying to analyze the captured image of the particular symbol target, in which case, the scan engine might have missed looking at a subsequent frame in which the captured image might have been more successfully decodable. Also, once a symbol target has been read, the scan engine might miss several frames while negotiating communication with a remote host computer in order to report the reading of that target, in which case, these missing frames represent more lost opportunities to read more targets.

These problems of missing frames, dropped images, insufficient processing time and loss of decodable information are magnified in many applications where multiple targets associated with multiple products are passed in a single pass through a workstation in groups or reading sessions. For example, the products may be automatically conveyed on a conveyor rapidly past a workstation window at a fast rate of speed, e.g., 100 inches per second and faster, or, the products may be manually conveyed past a workstation window in a single pass at a speed faster than the scan engine can indicate a successful reading for each target.

Accordingly, there is a need for an apparatus for, and a method of, reading all the targets presented to a workstation in a reading session with good, single-pass performance, without suffering from missing frames, dropped images, insufficient processing time and loss of decodable information.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus or workstation, in accordance with one feature of this invention, is operative for reading targets in succession, the targets being associated with transactions or products to be processed at the workstation. The apparatus includes a housing, a window supported by the housing, and a solid-state imager supported by the housing and having an array of light sensors looking at a field of view that extends through the window to the targets. The imager captures return light from the targets to be read. A controller controls the imager to operate at a frame rate to acquire images of the targets over successive frames. A memory accessible to the controller stores the acquired images. The controller processes all of the stored images, and processes at least one of the stored images over an extended time period greater than one of the frames.

In a batch mode of operation, the images are queued or buffered in the memory, which is configured with sufficient storage to store a required number of images for the targets. Storage of the images begins at a start capture event of a reading session, i.e., a start trigger point, such as object entry of a first one of the targets into the workstation, and ends at the end capture event of the reading session, i.e., an exit trigger point, such as object exit of a last one of the targets from the workstation, or the elapse of a predetermined time period after the detection of the object entry of the first target, as determined by the controller. After the end capture event, especially during idle, non-reading periods of non-activity of the workstation, the controller has more time and therefore can perform exhaustive processing on the buffered images. Advantageously, the controller can rank the buffered images and work on the high value images first, such as harder to decode symbol targets, e.g., two-dimensional or very small one-dimensional targets. The exhaustive processing on the buffered images helps obviate the prior art problems of missing frames, dropped images, insufficient processing time and loss of decodable information, especially in those applications where multiple targets associated with multiple products are automatically or manually passed in a single pass through a workstation in groups or reading sessions.

In a free-running mode of operation, the images are continuously being acquired and stored and processed. Well-printed, large symbols may be processed within a single frame, but harder to decode targets will take more time, that is, longer than one frame. The controller grants any such harder to decode targets the additional time that they need while continuing to acquire and store subsequent targets. These subsequent targets will eventually be processed as the controller catches up to the targets being presented.

Figure 1:
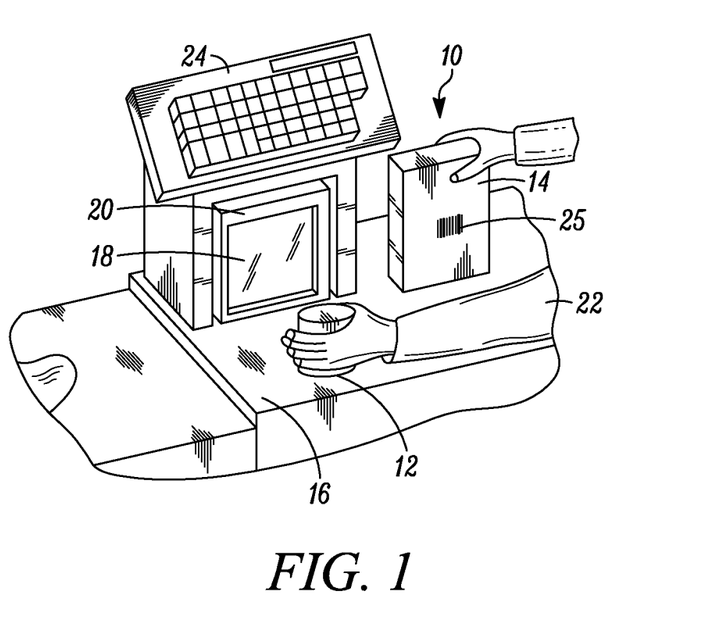
FIG. 1 is a perspective view of an apparatus or electro-optical workstation configured as a vertical slot scanner in accordance with this invention.

Reference numeral 10 in FIG. 1 generally identifies an electro-optical reading workstation for processing transactions at a checkout counter of a retail site at which objects or products, such as a can 12 or a box 14, each associated with, and preferably bearing, a target 25 such as a printed bar code symbol, are processed for purchase. The counter includes a countertop 16 across which the products are presented or slid at a swipe speed past and across a generally vertical or upright, generally planar, light-transmissive window 18 of a box-shaped housing 20 of an imaging reader configured as a vertical slot scanner mounted on the countertop 16. A user 22, preferably a checkout operator or a consumer, is located at one side of the countertop 16, and the housing 20 is located at the opposite side. A cash/credit register 24 is located within easy reach of the user 22. The housing 20 is portable and lightweight and may be picked up from the countertop 16 by the user 22, and the window 18 may be aimed at the target 25, preferably on a product too heavy or too large to be easily positioned on the countertop 16 in front of the housing 20 in the workstation mode.

Figure 2:
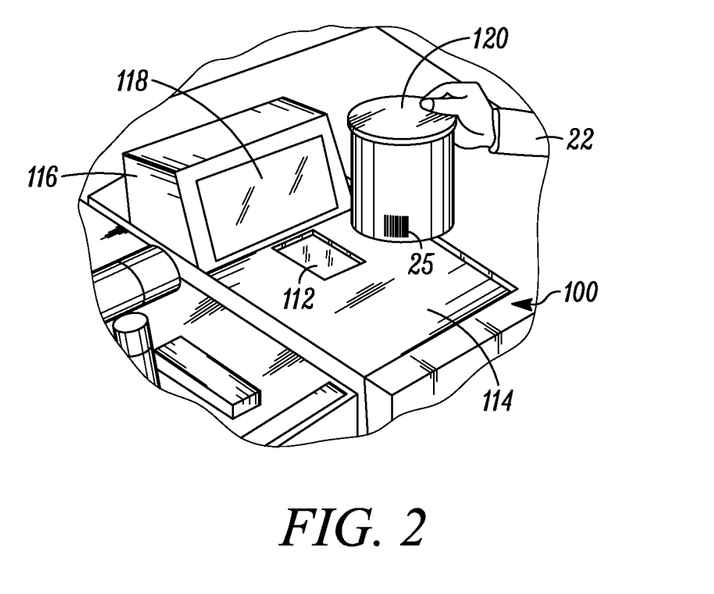
FIG. 2 is a perspective view of another apparatus or electro-optical workstation configured as a dual window, bi-optical workstation in accordance with this invention.

FIG. 2 depicts a dual window, bi-optical, point-of-transaction workstation 100 used by retailers to process transactions involving the purchase of products 120 bearing an identifying target, such as the printed target 25 described above. Workstation 100 has a generally horizontal window 112 set flush with, or recessed into, a countertop 114, and a vertical or generally vertical (referred to as "vertical" or "upright" hereinafter) window 118 set flush with, or recessed into, a raised housing portion 116 above the countertop. In use, the user 22 processes the product 120 bearing the target 25 thereon, past the windows 112, 118 by swiping the target 25 on the product 120 across a respective window in the abovementioned swipe mode, or by presenting the target 25 on the product 120 at the respective window in the abovementioned presentation mode. The target 25 may located on any of the top, bottom, right, left, front and rear, sides of the product 120.

Figure 3:
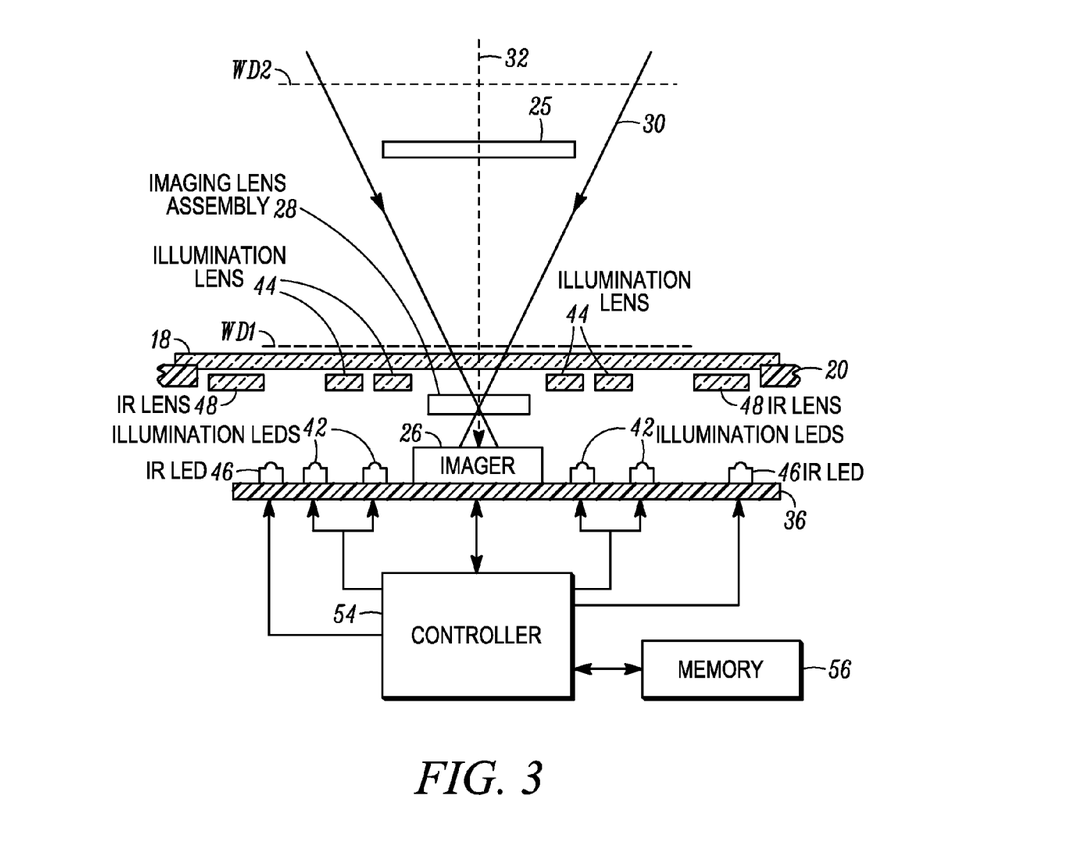
FIG. 3 is a part-schematic, part-diagrammatic view depicting various components of the representative workstation of FIG. 1.

The housing 20 of the workstation of FIG. 1 includes, as schematically shown in FIG. 3, an image sensor or imager 26 operable at a frame rate of multiple frames per second, and mounted on a printed circuit board (PCB) 36, and an imaging lens assembly 28 mounted in front of the imager 26. The imager 26 is a solid-state device, for example, a CCD or a CMOS imager and has a linear or area array of addressable image sensors or pixels, preferably of submegapixel or supermegapixel size, having a reading field of view 30 that diverges away from the window 18 in both horizontal and vertical directions. The imaging lens assembly 28 has an optical axis 32 generally perpendicular to the imager 26 and is operative for capturing light through the window 18 from the symbol target 25 of FIGS. 1-2, or like target, located in a range of working distances along the optical axis 32 between a close-in working distance (WD1) and a far-out working distance (WD2), and for projecting the captured light onto the imager 26. In a preferred embodiment, WD1 is about two inches from the imager 26 and generally coincides with the window 18, and WD2 is about eight inches or more from the window 18.

An illumination light system is also mounted in the housing 20 and preferably includes a plurality of illumination light sources, e.g., two pairs of light emitting diodes (LEDs) 42, mounted on the PCB 36 and arranged at opposite sides of the imager 26. Two pairs of illumination lenses 44 are mounted in front of the illumination LEDs 42 to uniformly illuminate the target 25 with illumination light.

An object sensing system is also preferably mounted in the housing 20 and is operative for sensing an object, e.g., any of the aforementioned products 12, 14, 120 associated with the target 25, and for generating a trigger signal to initiate the reading. The object sensing system includes an object light source, preferably a pair of infrared (IR) light emitting diodes (LEDs) 46 mounted on the PCB 36 at opposite sides of the imager 26, and a pair of IR lenses 48 mounted in front of the IR LEDs 46, and together operative for directing object sensing IR light, which is invisible to the human eye, in a wavelength range from about 700 nm to about 1100 nm, over a viewing angle through the window 18 at the objects 12, 14, 120 for return therefrom, and an object light sensor 50 (see FIG. 4) for detecting return object sensing IR light returned from the objects 12, 14, 120 along an object detection path through the window 18 over an object detection field of view.

Figure 4:
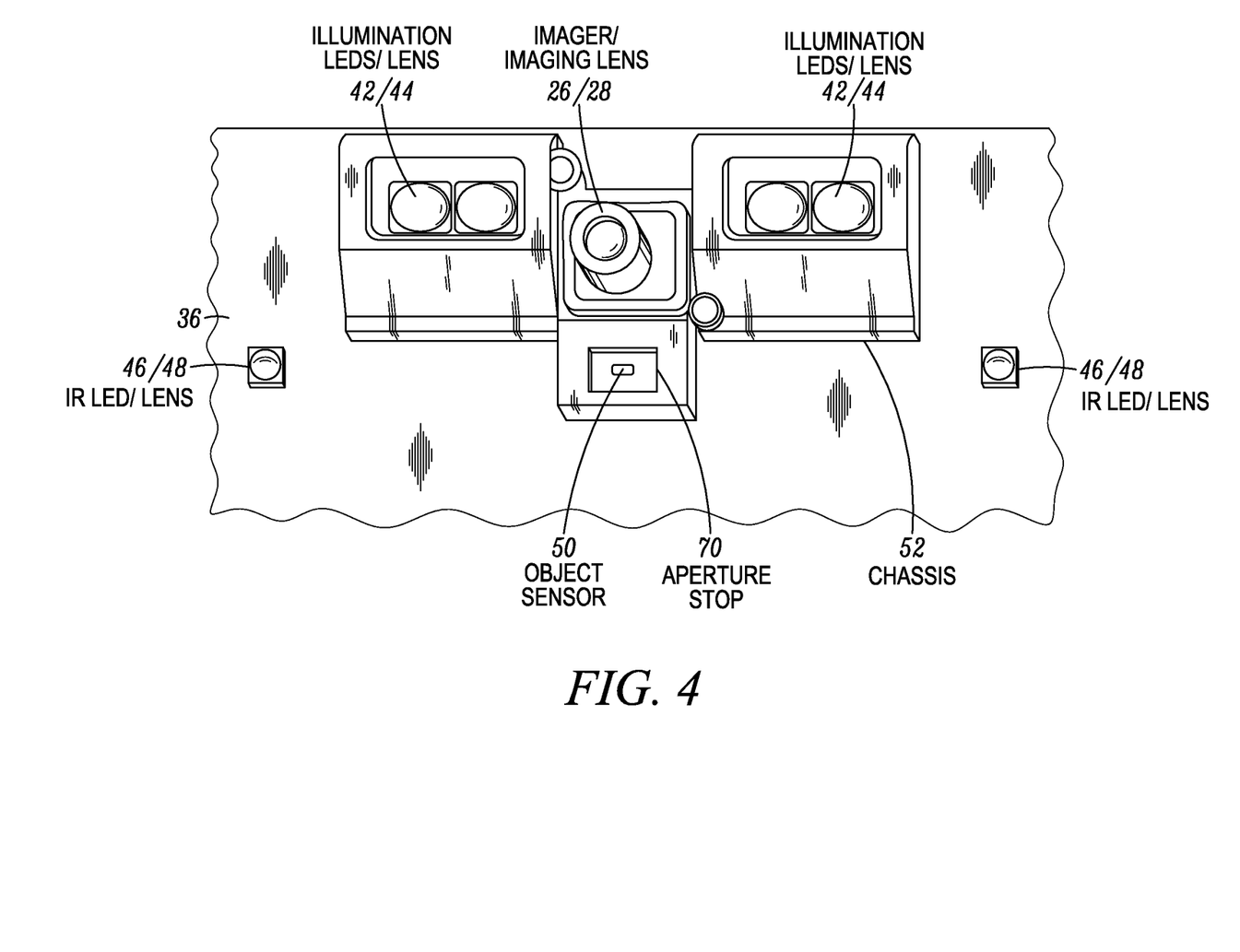
FIG. 4 is a broken-away, enlarged, perspective view depicting some of the components of FIG. 3.

The viewing angle of the IR LEDs 46 is approximately equal to the object detection field of view of the IR object sensor 50 for better system efficiency and pointing in the direction of the object of interest. The object detection field of view substantially overlaps the reading field of view 30. As best seen in FIG. 4, the object IR light sensor 50 is mounted on the PCB 36 between the IR LEDs 46 and below the imager 26. Other locations for the object IR light sensor 50 are contemplated. Also, all of the lenses 28, 44, and 48 are supported by a chassis 52 above the PCB 36 on which the imager 26, the illumination LEDs 42 and the IR LEDs 46 are mounted. The IR object sensor 50 may have an aperture stop 70 and a daylight filter to improve the signal-to-ambient light ratio for better performance. The daylight filter substantially blocks visible light in the range from about 350 nm to about 700 nm and lets the IR light, e.g., about 700 nm to about 1100 nm, pass. A narrow bandpass filter whose bandwidth corresponds to the wavelength of the IR LEDs 46 could also be beneficial.

Returning to FIG. 3, the imager 26, the illumination LEDs 42 and the IR LEDs 46 are operatively connected to a controller or programmed microprocessor 54 operative for controlling the operation of all these electrical components. A memory 56, preferably a first-in, first-out buffer, is connected and accessible to the controller 54. Preferably, the controller 54 is the same as the one used for decoding the return illumination light scattered from the target 25 and for processing the captured target images.

Figure 5:
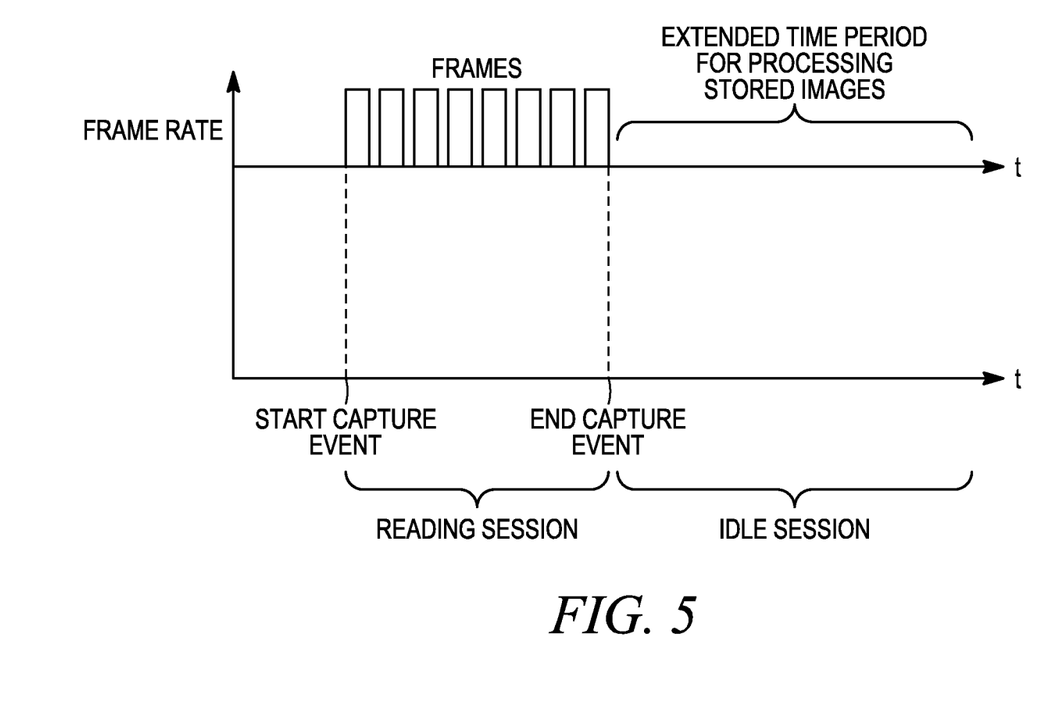
FIG. 5 is a graph depicting operation of some of the components of FIG. 3 in a batch mode in accordance with this invention.

A batch mode of operation is schematically shown in FIG. 5. A reading session begins at a start capture event and ends at an end capture event, as described below. The controller 54 controls the imager 26 to operate at a frame rate, e.g., about 60 frames per second, in which case, the fastest frame lasts about 16.67 milliseconds. The reading session preferably includes multiple targets 25, but can include a single target 25. Multiple images may be captured for each target 25. Successive images are acquired of the successive targets 25 over successive frames.

The memory 56 buffers or stores a stream of the images acquired during the reading session, and is configured with sufficient storage to store a required number of images for the targets 25. During an idle, non-reading session after the reading session, the controller 54 has an extended time period in which to process all the stored images, especially any difficult or hard to decode image in the image stream stored by the memory 56. During this idle session, the controller 54 performs exhaustive processing on the buffered image stream to look for harder to decode symbol targets, such as two-dimensional or smaller one-dimensional targets. Advantageously, the controller 54 can rank the buffered image stream and work on the high value images first. This exhaustive processing on the buffered image stream helps obviate the prior art problems of missing frames, dropped images, insufficient processing time and loss of decodable information, especially in those applications where multiple targets 25 associated with multiple products are automatically or manually passed through a workstation in groups or reading sessions.

The start and end capture events in the batch mode can be determined by the above-described object sensing system in which the IR object sensor 50 respectively detects entry and exit of the first and last objects into and from the field of view. The end capture event can also be determined by the controller 54 operative for determining a predetermined time after the start capture event to serve as the end capture event.

Figure 6:
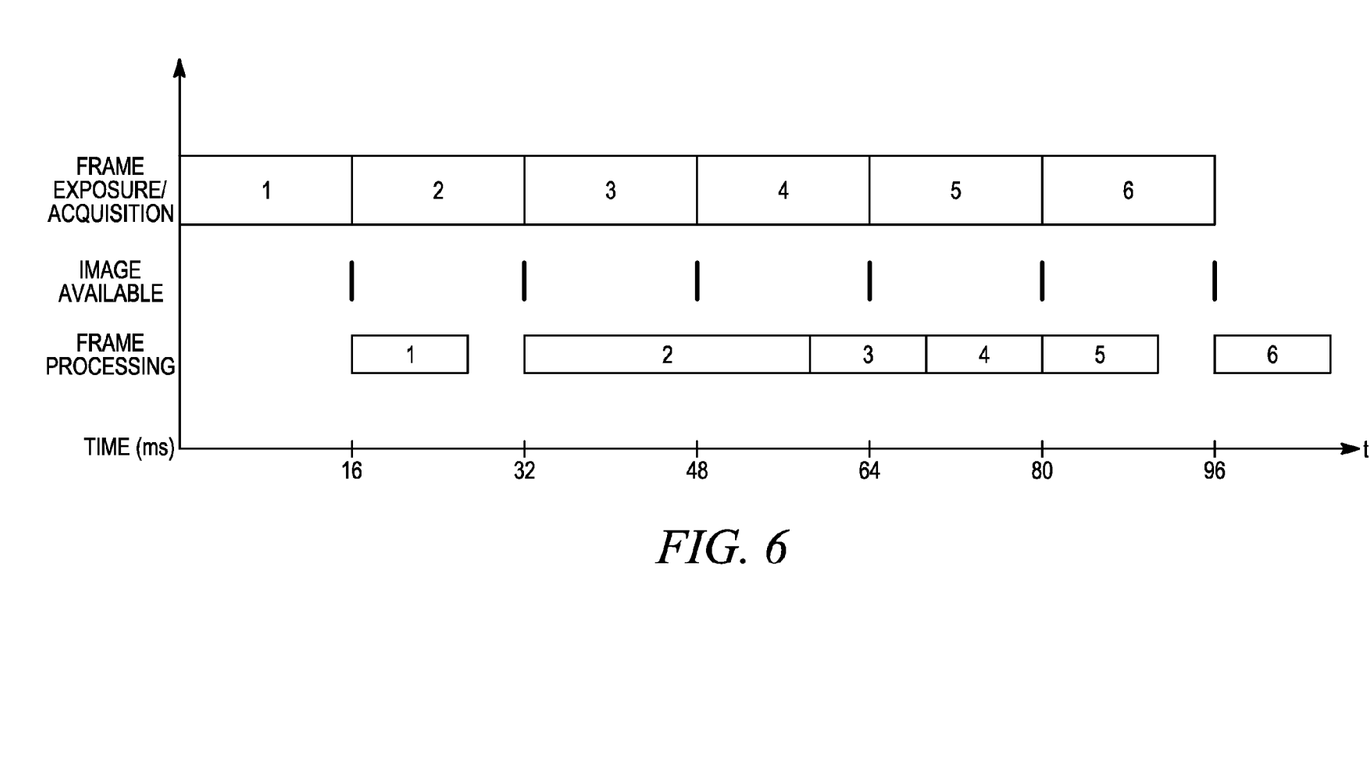
FIG. 6 is a graph depicting operation of some of the components of FIG. 3 in a free-running mode in accordance with this invention.

A free-running mode of operation is schematically shown in FIG. 6, in which representative frames 1, 2, 3, 4, 5 and 6 are shown in succession along a time scale, and the successive target images are also shown in time succession, one target image 1, 2, 3, 4, 5 and 6 for each frame. In the free-running mode of operation, the target images 1, 2, 3, 4, 5 and 6 are continuously being acquired and stored and processed. In the illustrated example, the processing times for images 1, 3, 4, 5 and 6 of well-printed, large targets require less than a single frame time (about 16 ms). However, image 2 is harder to decode and requires more time, for example, longer than one frame. The controller grants the image 2 the additional time that it needs to be successfully decoded while continuing to acquire and store the subsequent target images 3, 4, 5 and 6. These subsequent target images 3, 4, 5 and 6 will eventually be processed as the controller catches up to the targets being presented. Indeed, as illustrated, the average processing time for all the images 1, 2, 3, 4, 5 and 6 is less than one frame.

It will be understood that each of the elements described above, or two or more together, also may find a useful application in other types of constructions differing from the types described above. For example, the apparatus need not be operated solely in the batch mode depicted in FIG. 5, or solely in the free-running mode depicted in FIG. 6, but could be operated in a hybrid combination of both such modes. Also, the number of illumination LEDs 42 and their location can be different from those illustrated in the drawings; the number of IR LEDs 46 and their location can also be different from those illustrated in the drawings; and more than one object sensor 50 can be employed. Workstations having different shapes than those illustrated, with one or more windows, are also within the spirit of this invention. For example, a flat-bed workstation having a single generally horizontal window, or a gun-shaped housing mounted on a stationary stand or mount are other advantageous configurations. In addition, although the components of FIG. 3 has been described with respect to the window 18 of the workstation 10, the invention described herein is equally applicable to either window 112 or 118 of the workstation of FIG. 2. Although only one imager 26 has been illustrated, it will be understood that any workstation, especially the bi-optical workstation of FIG. 2, can, and frequently do, have more than one imager 26.

In accordance with another feature of this invention, a method of reading targets associated with transactions to be processed, is performed by supporting a window on a housing, capturing return light from the targets to be read with an array of light sensors of a solid-state imager having a field of view that extends through the window to the targets, operating the imager at a frame rate to acquire images of the targets over successive frames, storing the acquired images, processing all of the stored images, and processing at least one of the stored images over an extended time period greater than one of the frames.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for reading targets in succession, comprising:
  a housing;
  a window supported by the housing;
  a solid-state imager supported by the housing and having an array of light sensors looking at a field of view that extends through the window to the targets, and operative for capturing return light from the targets to be read;
  a controller for controlling the imager to operate at a frame rate to acquire images of the targets over successive frames;
  a memory accessible to the controller for storing the acquired images, the controller being operative for processing all of the stored images, and for processing at least one of the stored images over an extended time period greater than one of the frames; and wherein the controller controls the imager to operate in a batch mode in which entry of a first one of the targets into the field of view serves as a start capture event of a reading session, and in which exit of a last one of the targets from the field of view serves as an end capture event of the reading session; wherein the memory stores the acquired images of the targets during the reading session; and wherein the controller processes the stored images during an idle session following the reading session.

2. The apparatus of claim 1, wherein the window is substantially planar, and wherein the housing supports the window in one of a generally upright and a generally horizontal plane.

3. The apparatus of claim 1; and further comprising another window supported by the housing; wherein each window is substantially planar; and wherein the housing supports one of the windows in a substantially upright plane, and supports the other of the windows in a generally horizontal plane that intersects the upright plane.

4. The apparatus of claim 1; and an energizable illumination system supported by the housing, and operative for illuminating the targets with illumination light directed through the window; and wherein the imager is operative for capturing the return light as illumination light from the targets.

5. The apparatus of claim 1, wherein the controller is operative for ranking the images stored during the reading session, and for processing the images after the reading session in order of their ranking.

6. The apparatus of claim 1; and an object sensing system for detecting entry and exit of objects associated with the targets into and from the field of view to serve as the start and end capture events for the reading session.

7. The apparatus of claim 1, wherein the controller controls the imager to operate in a free-running mode in which the at least one stored image is processed while other images are being acquired by the controller.

8. The apparatus of claim 7, wherein the controller processes the images over an average processing time which is less than one of the frames.

9. The apparatus of claim 1, wherein the memory is a first-in, first-out buffer.

10. A method of reading targets in succession, comprising:
supporting a window on a housing;
capturing return light from the targets to be read with an array of light sensors of a solid-state imager having a field of view that extends through the window to the targets;
operating the imager at a frame rate to acquire images of the targets over successive frames;

storing the acquired images;

processing all of the stored images, and processing at least one of the stored images over an extended time period greater than one of the frames; and wherein the imager is operated in a batch mode in which entry of a first one of the targets into the field of view serves as a start capture event of a reading session, and in which exit of a last one of the targets from the field of view serves as an end capture event of the reading session; wherein the storing is performed by storing the acquired images of the targets during the reading session; and wherein the processing is performed by processing the stored images during an idle session following the reading session.

11. The method of claim 10, and configuring the window to be substantially planar, and supporting the window in one of a generally upright and a generally horizontal plane.

12. The method of claim 10; and supporting another window on the housing; and configuring each window to be substantially planar; and supporting one of the windows in a substantially upright plane, and supporting the other of the windows in a generally horizontal plane that intersects the upright plane.

13. The method of claim 10; and illuminating the targets with illumination light directed through the window; and wherein the capturing is performed by capturing the return light as illumination light from the targets.

14. The method of claim 10; and ranking the images stored during the reading session, and wherein the processing of the images after the reading session is performed in order of their ranking.

15. The method of claim 10; and detecting entry and exit of objects associated with the targets into and from the field of view to serve as the start and end capture events for the reading session.

16. The method of claim 10, wherein the imager is operated in a free-running mode in which the at least one stored image is processed while other images are being acquired.

17. The method of claim 10, wherein the images are processed over an average processing time which is less than one of the frames.

18. The method of claim 10, wherein the storing is performed in a first-in, first-out buffer.

* * * * *